United States Patent Office 3,684,568
Patented Aug. 15, 1972

3,684,568
METHOD OF RELEASING SOIL IN FABRICS
Ralph P. Arthur, Parkersburg, and Mary Joanne Belden, Washington, W. Va., assignors to Borg-Warner Corporation, Chicago, Ill.
No Drawing. Filed June 17, 1969, Ser. No. 834,135
Int. Cl. D06m 15/08
U.S. Cl. 117—139.4      6 Claims

ABSTRACT OF THE DISCLOSURE

A method of releasing soil from resin treated fabrics (durable press, permanent crease, wash and wear, no iron and easy care) by incorporating in, or top finishing the fabric with, up to 25% of a maleic anhydride-conjugated diene copolymer, as the hydrolized free acid, or salts of this copolymer.

BACKGROUND OF INVENTION

Prior to this invention, a great variety of soil release agents, were marketed to provide the proper amount of soil release characteristics in specific fabric materials. Many of the soil release agents were not sufficiently effective to provide a stain-free garment after laundering. Also, many of the release agents were not capable of remaining on a fabric after repeated washings and/or dry cleaning; thus they became inefficient after a short period of time.

The use of a given soil release agent depends on a variety of properties of the specific soil release agent as well as the properties of the fabric to which they are added. One of the primary considerations is that the release agent should not affect the physical properties of the fabric to which it is added. That is to say, the release agent must not interfere with the ability of the fabric to retain its press, wash and wear properties.

SUMMARY OF INVENTION

The present invention is directed to a system for facilitating the release of soil from a variety of aminoplast resin treated, oleophilic fabrics using the reaction product of maleic anhydride copolymerized with conjugated dienes as well as the acids and salts thereof. These soil release agents have the advantage that they can be used either in a single bath system to provide soil releasing action due to compatibility with a durable press carbamate system, or as a top finish to resin treated fabrics.

The composition used in the method of this invention will be more clearly understood from a reading of the following description which illustrates the incorporation of specific copolymers, acids and salts thereof with resin treated fabrics either as a part of the resin treatment bath or as a top dressing, to provide ease of removal of soil from given durable press fabrics.

Suitable salts of the maleic anhydride-conjugated diene copolymer are alkali metal salts, such as sodium, potassium and lithium salts, ammonium salts and substituted ammonium salts such as mono-, di-, or tri-hydroxyalkyl ammonium salts and mono-, di-, or tri-alkylammonium salts.

The salts of the maleic anhydride-conjugated diene copolymer are prepared by neutralizing the hydrolyzed conjugated diene-maleic anhydride copolymer with the appropriate base.

Conjugated dienes which are useful in preparing the copolymer components have the general structural formula:

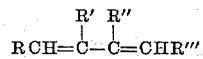

wherein R, R', R" and R'" may be the same or different and represent a radical from the group consisting of hydrogen, halogen, alkoxyl, aryl, cycloalkyl or alkyl radicals having from 1 to 8 carbon atoms, and preferably from 1 to 3 carbon atoms. Illustrative conjugated dienes include butadiene, isoprene, substituted butadienes such as 2-chloro-1,3-butadiene; 2,3-dichloro-1,3-butadiene; 2,3-dimethyl-1,3-butadiene; 1-methoxy-1,3-butadiene, piperylene and the like.

The maleic anhydride derivatives that are useful in the method of this invention for preparing the copolymers, other than maleic anhydride, comprise monochloromaleic anhydride, dichloromaleic anhydride and saturated half esters of maleic acid containing from 1 to 18 carbon atoms and preferably 1 to 3 carbon atoms.

In general, the molar ratio of conjugated diene to maleic anhydride or maleic anhydride derivative that are reacted will range from 1.2:1 to 1:1 since it has been determined that upon completion of the polymerization reaction, the copolymers contain maleic anhydride or maleic anhydride derivative and the conjugated diene in a nearly 1:1 molar ratio.

The maleic anhydride-conjugated diene copolymer in the hydrolized free acid form or salt form is an effective soil release agent for standard resin treated fabrics. By resin treated fabrics, it is meant those that are treated with materials to impart permanent press characteristics such as urea formaldehydes, e.g., propylene urea formaldehyde, dimethylol urea formaldehyde, etc.; melamine formaldehydes, e.g., tetramethylol melamines, pentamethylol mealmines, etc.; ethylene ureas, e.g., dimethylol ethylene urea, dihydroxy dimethylol ethylene urea, ethylene urea formaldehyde, hydroxy ethylene urea formaldehyde, etc., carbamates, e.g., alkyl carbamate formaldehydes, etc.; formaldehyde-acrolein condensation products; formaldehyde-acetone condensation products; alkylol amides, e.g., methylol formamide, methylol acetamide, etc.; acrylamides, e.g., N-methylol acrylamide, N-methylol methacrylamide, N-methylol-N-methacrylamide, N-methylmethylolacrylamide, N-methylol methylene-bis(acrylamide), methylene - bis(N - methylol acrylamide), etc.; haloethylene acrylamide; diureas, e.g., trimethylol acetylene diurea, tetramethylol-acetylene diurea, etc.; triazones, e.g., dimethylol-N-ethyl triazone, N-N'-ethylene-bis dimethylol triazone, halotriazones, etc.; haloacetamides, e.g., N-methylol-N-methylchloroacetamide, etc.; urons, e.g., dimethylol uron, dihydroxy dimethylol uron, etc., and the like. Mixtures of aminoplast textile resins are also within the scope of the present invention. The copolymer and/or the acid or salt form of the copolymer is bonded to the fabric during the cure cycle and will not be removed through repeated laundering. The copolymer, in addition to being an excellent soil release agent, does not increase the stiffness of the fabric over that provided by the resin treatment itself.

Soil removal ability is improved on the resin treated fabric as previously mentioned. Suitable durable press fabrics are those prepared from polyester fiber, such as Dacron, Terylene, Kodel, etc., or other synthetic fibers in combination with cellulosic fibers, such as cotton, paper and the like; or in combination with wool, etc.

In order to illustrate the method of the instant invention, the following experimental data is provided wherein the aforementioned maleic anhydride-conjugated diene copolymer or derivative of the copolymer is either added to a resin treatment solution to provide treated fabric or applied as a top dressing. The treated fabric is subjected to soil and the soil release properties of the fabric are tested and recorded. In providing the first example herein, a treating bath was prepared by dispersing the following components in water:

| | Percent |
|---|---|
| (50% solution) dihydroxy dimethylol ethylene urea | 25 |
| ($MgCl_2 \cdot 6H_2O$) magnesium chloride solution (50%) | 5.0 |
| Polyethylene emulsion | 3.0 |
| Blend of polyether alcohols | 0.2 |

The above composition was used to saturate samples of 65/35 polyester/cotton fabric to a 60% wet pickup. The fabric was dried for two minutes at 300° F. and a crease was pressed into the fabric sample with an electric iron. Three fabric samples were labeled A, B and C. Sample A, as control, was cured at 340° F.

The fabric sample, B, was treated by a 65% wet pickup with a 6% aqueous solution of copolymer derived from maleic anhydride-conjugated diene (ammonium salt). The fabric sample, C, was treated with 5.6% aqueous copolymer solution derived from maleic anhydride-conjugated diene (free acid).

Fabric sample C was treated as sample B to retain 65% wet pickup by weight of treatment solution in the fabric.

Two sets of samples were prepared from each of the groups described, i.e., two control samples, two with the ammonium salt and two with the free acid. In each instance, the samples were identified as A, B and C and A', B' and C'. Samples A, B and C were stained with used motor oil and subjected to one wash cycle in a washing machine using 2½ g. "Tide," a commercial detergent, and one liter of tap water at a temperature of 140° F. and were dried 40 minutes at 150° F. Samples A', B', and C' were stained, washed five times under identical conditions and dried after each wash cycle. After the fifth cycle, samples A', B' and C' were respotted with used motor oil and subjected to one wash-dry cycle. Upon completion of the above cycles, the residual oil stains in the test specimens were compared to a set of standards rated from one to five. The rating of five represents complete removal of the stain and one represents little or no removal of the stain. The data set forth in Table I, hereinbelow, refers to MAS which represents the ammonium salt of maleic anhydride-diene copolymer and MFA is maleic anhydride-diene free acid. The creases placed in the test specimens remained unimpaired after six wash cycles and there was no change in crease retention as a result of the different soil release agents.

TABLE I.—SOIL RELEASE DATA FOR 65/35 POLYESTER/COTTON TREATED WITH MALEIC ANHYDRIDE CONJUGATED DIENE COPOLYMER

| Sample | Treatment | Soil release rating |
|---|---|---|
| A | Control | 2.0 |
| B | MAS | 5.0 |
| C | MFA | 4.2 |
| A' | Control | 2.0 |
| B' | MAS | 4.8 |
| C' | MFA | 4.0 |

Polyester cotton fabric was treated as set forth for the description of Table I and subsequently treated with three different soil release agents, two of which were the same as in Table I, above. Additionally, samples were treated with a third soil release agent, namely, a modified acrylic emulsion designated Rhoplex SR-488 (a tradename of Rohm and Haas). Fabric swatches were also tested that were pretreated with a durable press soil release agent sold commercially but unknown to applicant. The wash conditions were as set forth for the examples in Table I and the spotting compositions are set forth herein in Table II.

TABLE II

| | Hydrolized butadiene-maleic anhydride NH₄ salt | | Acrylic emulsion soil release | | Durable press soil release | |
|---|---|---|---|---|---|---|
| Wash cycles | 1 | 6 | 1 | 6 | 1 | 6 |
| Grape juice | 5 | 3 | 5 | 4 | 5 | 2 |
| Motor oil | 5 | 5 | 5 | 5 | 5 | 5 |
| Mustard | 3 | 4 | 4 | 5 | 5 | 3 |
| Liquid makeup | 4 | 3 | 5 | 4 | 5 | 4 |
| F. dressing | 5 | 5 | 5 | 5 | 5 | 5 |
| Tabasco | 2 | 5 | 2 | 5 | 3 | 5 |
| Spaghetti sauce | 4 | 5 | 5 | 5 | 5 | 5 |
| Butter | 5 | 5 | 5 | 5 | 5 | 5 |
| Catsup | 5 | 4 | 5 | 4 | 5 | 5 |

In a second method of using the soil release agents of this invention, the release agent is added to the resin treating solution. The resin treating solution is prepared as follows:

| | Percent on wt. basis |
|---|---|
| 50% solution modified carbamate resin | 25 |
| Ester sulfonate | 1.5 |
| Blend of fatty acid esters | 5 |
| Buffered magnesium salt | 10 |
| Water | 55.5 |
| Maleic anhydride conjugated diene copolymer (free acid) | 3 |

A fabric was cut into a number of swatches and the swatches were treated to obtain a 70% wet pickup of the resin solution, dried and cured at 150° C. for two minutes. The results of staining are set forth in Table III.

TABLE III

| | Butadiene-maleic anhydride free acid—1 bath | |
|---|---|---|
| Wash cycles | 1 | 6 |
| Grape juice | 2 | 1 |
| Motor oil | 2 | 4 |
| Mustard | 3 | 3 |
| Liquid makeup | 4 | 4 |
| F. dressing | 4 | 5 |
| Tabasco | 2 | 5 |
| Spaghetti sauce | 4 | 5 |
| Butter | 5 | 5 |
| Catsup | 4 | 4 |

In the following examples, the conditions of pad-dry-cure below were the same as stated in the description for the examples set forth in Tables I and III with the exception that a different diene was used in preparing the copolymer.

TABLE IV

| | Percent | | | 6 wash after respot |
|---|---|---|---|---|
| Sample designation | Wet pickup | Dry fabric | 1 wash | |
| Hydrolized isoprene-maleic anhydride copolymer, free acid, top finish | 124 | 1.47 | 1 | 4.5 |
| Hydrolized isoprene-maleic copolymer potassium salt, top finish | 120 | 9.84 | 4 | 2.0 |
| Hydrolized isoprene-maleic anhydride copolymer ammonium salt, top finish | 130 | 7.7 | 1 | 5.0 |
| Hydrolized isoprene-maleic anhydride copolmer free acid, one bath system | 100 | 8.3 | 2 | 3.5 |

The tables above set forth illustrative examples of the soil release agents and their ability to enhance the removal of soil from fabrics that have been resin treated for permanent press. It will be understood by those skilled in the art that the invention is described with respect to certain specific embodiments only. The examples are not meant to in any way limit the invention and the scope of the invention is defined solely by the appended claims which should be construed as broadly as is consistent with the prior art.

We claim:

1. A method of facilitating the removal of soil from a crease resisting resin treated fabric during laundering, comprising the steps of treating the fabric with an aqueous solution containing up to 25% by weight of a composition selected from the group consisting of maleic anhydride-conjugated diene copolymers, salts and free acids delivered from maleic acid-diene copolymers to provide permanent soil release qualities to the treated fabric.

2. The method of claim 1 wherein the resin treated fabrics have been treated with a resin selected from the group consisting of urea formaldehydes, melamine formaldehydes, ethylene ureas, carbamates, formaldehyde-acrolein condensation products; formaldehyde-acetone condensation products; alkylol amides, acrylamides, haloethylene acrylamide; diureas, triazones, haloacetamides, urons and mixtures of aminoplast textile resins.

3. The method of claim 1 wherein the maleic anhydride-conjugated diene salt is selected from the group consisting of alkali metal salts, ammonium salts and substituted ammonium salts.

4. The method of claim 1 wherein the maleic-anhydride-conjugated diene copolymer compound is incorporated in the permanent press resin system to produce a one bath resin treatment/soil release system.

5. The method of claim 1 wherein the maleic anhydride-conjugated diene copolymer compound is added to the fabric after the fabric has been resin treated for crease resisting qualities.

6. The method of claim 1 wherein the conjugated diene utilized to prepare the copolymer is of the structure

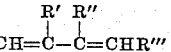

wherein R, R', R" and R''' may be the same and wherein each represents a radical selected from the group consisting of hydrogen, halogen, alkoxyl, aryl, cycloalkyl or alkyl radicals having from 1 to 8 carbon atoms.

References Cited
UNITED STATES PATENTS

| | | | |
|---|---|---|---|
| 2,540,072 | 1/1951 | Hays | 260—78.5 |
| 2,967,174 | 1/1961 | Bartl | 117—161 X |
| 3,081,283 | 3/1963 | Bosmajian | 117—161 X |
| 3,377,249 | 4/1968 | Marco | 8—115.6 |
| 3,491,068 | 1/1970 | Gaylord | 260—78.5 |

WILLIAM D. MARTIN, Primary Examiner

T. G. DAVIS, Assistant Examiner

U.S. Cl. X.R.

117—47 R, 138.8 F, 139.5 A, 161 UD

UNITED STATES PATENT OFFICE
CERTIFICATE OF CORRECTION

Patent No.  3,684,568           Dated August 15, 1972

Inventor(s)   Ralph P. Arthur, et. al.

It is certified that error appears in the above-identified patent and that said Letters Patent are hereby corrected as shown below:

Column 5, line 18, "delivered" should read -- derived -- .

Signed and sealed this 20th day of March 1973.

(SEAL)
Attest:

EDWARD M. FLETCHER, JR.                ROBERT GOTTSCHALK
Attesting Officer                      Commissioner of Patents